Patented Sept. 29, 1925.

1,555,505

UNITED STATES PATENT OFFICE.

ALFRED T. LARSON, OF WASHINGTON, DISTRICT OF COLUMBIA.

CATALYSTS AND PROCESS OF PRODUCING THE SAME.

No Drawing. Application filed March 21, 1924, Serial No. 700,955. Renewed February 20, 1925.

*To all whom it may concern:*

Be it known that I, ALFRED T. LARSON, a citizen of the United States, residing in Washington, District of Columbia, have invented new and useful Improvements in Catalysts and Processes of Producing the Same, of which the following is a specification.

My invention relates to the production of catalysts that are suitable more particularly for the manufacture of ammonia by synthesis from its elements, although the same are not exclusively limited to that purpose. The present application is in part a continuation of my former applications Serial No. 449,521, filed March 3, 1921, and Serial No. 573,741, filed July 8, 1922.

In my said former applications I referred to the use of catalysts, including iron, in the synthetic production of ammonia, and pointed out that, whereas oxides of most of the metals had been suggested as promoters for, or promotive additions to, such catalysts, I had, however, discovered that an indiscriminate selection of one or more of such oxides not only does not produce a catalyst having superior catalytic properties or activity, or impart increased or prolonged catalytic powers thereto, but that in many instances the proposed oxides have the reverse effect and are in fact detrimental additions to and impair or destroy the catalytic power of the catalyst.

In my said applications I disclosed my discovery of the principle that when a plurality of metal oxides mutually or reciprocally related one to another as respectively basic and acidic, or as electro-positive and electro-negative, were added to the catalyst, a marked improvement in its catalytic power is obtained. I have designated promotive additions of this character as composite, or multi-component, promoters.

The present invention is in accordance with this principle, and pursuant thereto I employ an oxide of potassium and an oxide of zirconium as a composite or multi-component promoter for addition to the main catalytic agent such as iron. The oxide of potassium and oxide of zirconium are mixed with an oxide of the main catalytic material and the mixture reduced in an atmosphere of hydrogen at a low temperature such as, for example, below 600° C. The product obtained is a catalytic material having improved and prolonged catalytic activity and is well suited for the synthetic production of ammonia. The proportion of the composite promoter to be added to the catalytic material proper may be approximately from 0.25 per cent to 2 per cent of potassium oxide and from 0.25 per cent to 10 per cent of the zirconium oxide by weight of the total catalytic material, calculated as oxides.

In my said former applications I pointed out that multi-component or composite promoters of the character described may advantageously be added to other materials known to catalyze the direct synthetic ammonia reaction. For example, such multi-component or composite promoter may be added to cobalt and improved results obtained. I also pointed out that the main catalytic material or catalyst proper to which such promoter is to be added, may, instead of a single metal or element, consist of a plurality of catalytic metals or elements. These modifications also apply to the composite or multi-component promoter containing potassium and zirconium as herein set forth, which may likewise be added with advantageous results to a catalytic material consisting of a plurality of catalytic substances.

In accordance with the present invention, the materials employed for producing the catalyst may, as in my former applications, be either the oxides themselves, the metals or elements of which become oxides when heated in an oxidizing atmosphere; or also, compounds of such metals or elements such as the hydroxides, carbonates, nitrates, organic compounds, etc., which on heating at a sufficiently high temperature, are converted to their respective oxides. Also, naturally occurring compounds which contain the desired components, or which on heating at sufficiently high temperature will change over into those components, may be employed.

In preparing my improved catalyst according to the present invention, precautions should be taken to exclude those substances which, as I have heretofore pointed out, interfere with and diminish catalytic activity and are generally known as catalyst poisons. Among such poisons are fluorine, chlorine, bromine, iodine, sulphur, selenium, tellurium, phosphorus, arsenic, antimony, bismuth, lead, tin, boron and compounds containing the same. In order to obtain an active and robust catalyst, these poisons must be excluded from the materials employed.

In order to more specifically illustrate my present invention, but without limiting the same, I give the following example: Add to molten iron oxide a mixture consisting of approximately 1% of potassium oxide and 1% of zirconium oxide. The total weight of the promoter mixture is thus approximately 2% of the total weight of the catalyst or catalytic material. Stir the molten mixture, allow it to cool and then break into small pieces. The pieces of catalyst material so produced are now placed in a suitable container and reduced with hydrogen or with a mixture of hydrogen and nitrogen, the reducing gases being free from catalyst poisons. The initial stages of the reduction should preferably be at a relatively low temperature, approximately 300–400° C. The temperature of reduction is then slowly increased until that temperature has been reached at which it is proposed to conduct catalytic reaction. For example, ammonia can now be produced if a current of the mixed constituent gases containing 3 volumes of hydrogen and 1 volume of nitrogen free from catalyst poisons is passed through this catalytic material while maintaining a temperature of about 400–550° C., the gas being at atmospheric or higher pressure. It will be understood that various changes or modifications may be made in the details of my invention without departing from the principle thereof.

What I claim is—

1. An active catalyst comprising a substance having catalytic properties and a composite promoter, said composite promoter containing an oxide of zirconium and an oxide of an element relatively basic thereto.

2. An active catalyst comprising a substance having catalytic properties and a composite promoter, said composite promoter containing an oxide of zirconium and an oxide of potassium.

3. An active catalyst comprising iron, and a composite promoter, said composite promoter containing an oxide of zirconium and an oxide of an element relatively basic thereto.

4. An active catalyst comprising iron, and a composite promoter, said composite promoter containing an oxide of zirconium and an oxide of potassium.

5. An active catalyst for the manufacture of ammonia from its elements, consisting of a substance having catalytic properties and a composite promoter, said composite promoter being free from catalyst poisons and comprising an oxide of potassium and an oxide of zirconium.

6. An active catalyst for the manufacture of ammonia from its elements containing iron and a composite promoter, said composite promoter being free from catalyst poisons and comprising an oxide of potassium and an oxide of zirconium.

7. An active catalyst for the manufacture of ammonia from its elements, consisting of iron and a composite promoter, said composite promoter being free from catalyst poisons and comprising 0.25% to 2% of potassium oxide and 0.25% to 10% of zirconium oxide by weight of the total catalytic material calculated as oxides.

8. An active catalyst for the manufacture of ammonia from its elements, said catalyst consisting of the reduction product of a mixture composed of iron oxide, and a composite promoter free from catalyst poisons and comprising potassium and zirconium oxide.

9. An active catalyst for the manufacture of ammonia from its elements, said catalyst consisting of the reduction product of a mixture composed of iron oxide and a composite promoter, said composite promoter being free from catalyst poisons and comprising 0.25 to 2% of potassium oxide and 0.25 to 10% of zirconium oxide, by weight of the total catalytic material calculated as oxides.

10: A process for producing an active catalyst for the manufacture of ammonia from its elements, which comprises melting together iron oxide and a composite promoter, said promoter being free from catalyst poisons, and comprising potassium oxide and zirconium oxide, the potassium oxide being in the proportion of 0.25 to 2%, the zirconium oxide being in the proportion of 0.25 to 10% by weight of the total catalytic material calculated as oxides; allowing the mass to cool, breaking the same into suitably sized fragments for use, and reducing the fragments with hydrogen at a temperature of 300–600° C.

ALFRED T. LARSON.